United States Patent
He et al.

(10) Patent No.: US 11,431,841 B2
(45) Date of Patent: Aug. 30, 2022

(54) VOLTE-BASED VOICE CALL METHOD AND SYSTEM

(71) Applicant: JRD Communication (Shenzhen) Ltd., Shenzhen (CN)

(72) Inventors: Jiancai He, Shenzhen (CN); Dezheng Feng, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 80 days.

(21) Appl. No.: 16/607,327

(22) PCT Filed: Apr. 24, 2018

(86) PCT No.: PCT/CN2018/084238
§ 371 (c)(1),
(2) Date: Oct. 22, 2019

(87) PCT Pub. No.: WO2018/196742
PCT Pub. Date: Nov. 1, 2018

(65) Prior Publication Data
US 2020/0068067 A1     Feb. 27, 2020

(30) Foreign Application Priority Data
Apr. 26, 2017   (CN) .......................... 201710282634.4

(51) Int. Cl.
*H04M 3/42*     (2006.01)
*H04L 29/06*    (2006.01)
(Continued)

(52) U.S. Cl.
CPC .... *H04M 3/42195* (2013.01); *H04L 65/1066* (2013.01); *H04M 1/274* (2013.01); *H04M 3/42034* (2013.01); *H04M 7/006* (2013.01)

(58) Field of Classification Search
CPC ............. H04M 3/42195; H04M 1/274; H04M 3/42034; H04L 65/1066; H07M 7/006
(Continued)

(56) References Cited

U.S. PATENT DOCUMENTS 7,869,821 B2   1/2011   Legrand et al.
9,225,757 B2   12/2015  Jagannathan et al.
(Continued)

FOREIGN PATENT DOCUMENTS

CN   1866997 A     11/2006
CN   101166314 A   4/2008
(Continued)

*Primary Examiner* — Ahmad F. Matar
*Assistant Examiner* — Jirapon Intavong
(74) *Attorney, Agent, or Firm* — Hamre, Schumann, Mueller & Larson, P.C.

(57) ABSTRACT

Disclosed in the present invention is a VoLTE-based voice call method. The method comprises: a calling terminal determining whether a VoLTE call mode is activated: if so, the calling terminal generating a call request, the call request comprising contact card information of the calling terminal; and the calling terminal sending the call request to the called terminal, so as to enable the called terminal to acquire the contact card information of the calling terminal from the call request. The present invention can facilitate users to exchange contact card information.

12 Claims, 3 Drawing Sheets

(51) Int. Cl.
*H04L 65/1066* (2022.01)
*H04M 1/274* (2006.01)
*H04M 7/00* (2006.01)

(58) Field of Classification Search
USPC .................................................. 379/201.01
See application file for complete search history.

(56) References Cited

U.S. PATENT DOCUMENTS

| | | | |
|---|---|---|---|
| 2005/0281237 A1* | 12/2005 | Heinonen | H04L 29/06 370/338 |
| 2007/0152036 A1 | 7/2007 | Daigle et al. | |
| 2008/0096599 A1* | 4/2008 | Legrand | H04W 4/10 455/519 |
| 2019/0045335 A1* | 2/2019 | Jin | H04M 3/42153 |

FOREIGN PATENT DOCUMENTS

| | | |
|---|---|---|
| CN | 102355636 A | 2/2012 |
| CN | 103369152 A | 10/2013 |
| CN | 104967621 A | 10/2015 |
| CN | 106454783 A | 2/2017 |
| CN | 107277284 A | 10/2017 |

* cited by examiner

VOLTE-BASED VOICE CALL METHOD AND SYSTEM

CROSS REFERENCE

This application is a National Stage of International Application No. PCT/CN2018/084238, filed on Apr. 24, 2018, which claims priority to Chinese Application No. 201710282634.4, filed on Apr. 26, 2017, the disclosure of which is incorporated herein by reference.

FIELD OF THE INVENTION

The present invention relates to a mobile communication technology, and more particularly to a voice communication method and system based on voice over long term evolution (VoLTE).

BACKGROUND

Smart phones are used for all kinds of human's activities. People utilize smart phones to get each other's contact information. Normally, a smart phone user may ask another person to give him a call in order to know his phone number. However, this is limited to get the phone number from another person but cannot be used to get more contact information from him. For example, after the phone number is acquired, the smart phone user needs to further ask for another person's name, company's name, title, fax number, email address or other information. Then, the smart phone user needs to add a new contact and manually input all the aforementioned information into the address book. This is inconvenient and cannot assure the accuracy and integrity of the information.

SUMMARY

The technical issue that a preferred embodiment of the present invention solves is to provide a voice communication method and system to allow the users to exchange their business card.

According to an embodiment of the present invention, a voice communication method based on voice over long term evolution (VoLTE) is provided. The method comprises: utilizing a calling terminal to determine whether to activate a VoLTE calling mode; if yes, then utilizing the calling terminal to generate a calling request carrying a business card information of the calling terminal and to send the calling request to a called terminal such that the called terminal obtains the business card information of the calling terminal from the calling request; wherein the calling request is an INVITE packet comprising a SDP content; and if not, then utilizing the calling terminal sends a calling request corresponding to another communication mode to the called terminal; wherein the step of utilizing the calling terminal to generate the calling request comprises utilizing the calling terminal to assign the business card information to the SDP content.

According to another embodiment of the present invention, a voice communication method based on voice over long term evolution (VoLTE) is provided. The method comprises: utilizing a called terminal to receive a calling request from a calling terminal; utilizing the called terminal to generate a calling notice when the called terminal receives the calling request and utilizing the called terminal to determine whether the calling request comprises a business card information of the calling terminal; and if yes, then utilizing the called terminal to obtain and store the business card information of the calling request.

According to another embodiment of the present invention, a voice communication system based on VoLTE is provided. The voice communication system comprises a calling terminal comprising a first processor and a first communicator, coupled to the first processor; and a called terminal comprising a second processor; a second communicator coupled to the second processor; an output device; and a storage device; wherein the first processor is configured to determine whether to activate a VoLTE calling mode; if yes, then generate a calling request carrying a business card information of the calling terminal; the first communicator is configured to send the calling request to the called terminal; the second processor is configured to control the output device to generate a calling notice when the second communicator receives the calling request and to further determine whether the calling request comprises a business card information of the calling terminal and obtain and store the business card information of the calling request if the calling request comprises the business card information.

In contrast to the prior art, the present invention utilizes a calling terminal to determine whether to activate a VoLTE communication mode. If yes, then the calling terminal generates a calling request carrying a business card information. Further, the calling terminal sends the calling request to the called terminal to allow the called terminal to obtain the business card information of the calling terminal from the calling request. Because the calling terminal could embed the business card information into the calling request, when the calling terminal makes a call, the business card information is sent to the called terminal along with the calling request such that the phone users could easily exchange the business card information.

DETAILED DESCRIPTION OF PREFERRED EMBODIMENTS

The present disclosure will be described in details below by using embodiments in conjunction with the appending drawings.

Figure 1:
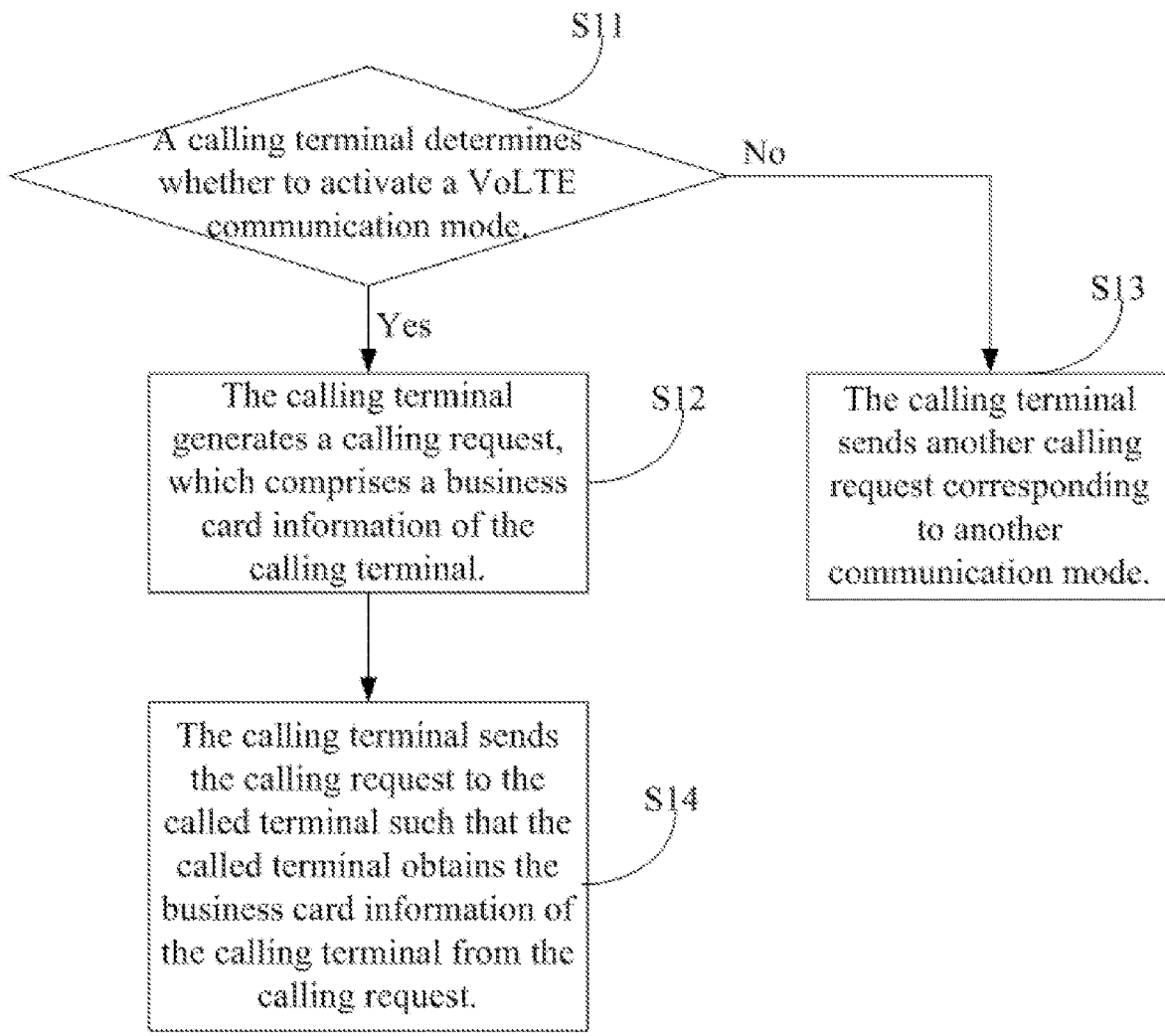
FIG. 1 is a flow chart showing a voice communication method based on VoLTE according to an embodiment of the present invention.

Please refer to FIG. 1. FIG. 1 is a flow chart showing a voice communication method based on Voice over Long Term Evolution (VoLTE) according to an embodiment of the present invention. In this embodiment, the voice communication method based on VoLTE comprises following steps:

Step S11: A calling terminal determines whether to activate a VoLTE communication mode.

In Step S11, VoLTE is a voice service based on Internet Protocol Multimedia Subsystem (IMS). Further, in step S11, if the calling terminal determines that the VoLTE communication mode needs to be activated, then step S12 is performed.

Step S12: The calling terminal generates a calling request, which comprises a business card information of the calling terminal.

In step S12, the calling request is an INVITE packet, which comprises a header and a Session Description Protocol (SDP) content. Furthermore, the step of generating the calling request could comprise: assigning the business card information to SDP content.

In an embodiment, the SDP content comprises an A session description. The A session description comprises multiple attribute columns. The business card information of the calling terminal could comprise multiple information items of the user of the calling terminal, such as the user's name, business name, business address, business number, home number, cell phone number, fax number, email address or other information.

The step of assigning the business card information to SDP content could comprise respectively assigning multiple information items of the business card information to the multiple attribute columns in the A session description of the SDP content.

The header could comprise network address information of a called terminal, such as the called terminal's phone number, IP address or other information such that the calling request could be sent from the base station to the called terminal.

In addition, in step S11, if the calling terminal determines that the VoLTE communication mode does not need to be activated, then step S13 is performed.

Step S13: The calling terminal sends another calling request corresponding to another communication mode.

In step S13, the another communication mode could be a non-VoLTE communication mode. The calling terminal sends the calling request corresponding to the non-VoLTE communication mode to the called terminal.

Step S14: The calling terminal sends the calling request to the called terminal such that the called terminal obtains the business card information of the calling terminal from the calling request.

In step S14, the calling terminal sends the calling request generated in step S12 to the called terminal such that the called terminal obtains the business card information of the calling terminal from the calling request. More details will be illustrated in the following disclosure.

Figure 2:
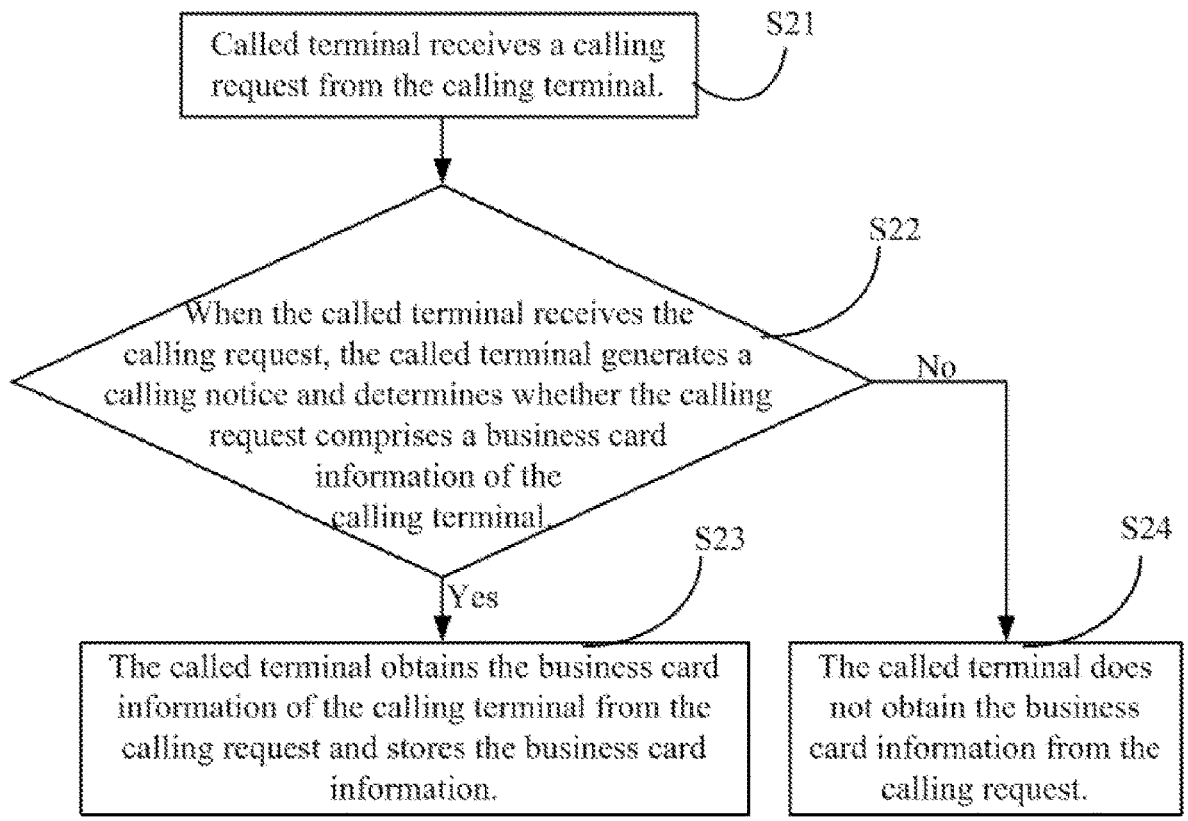
FIG. 2 is a flow chart showing a voice communication method based on VoLTE according to another embodiment of the present invention.

Please refer to FIG. 2. FIG. 2 is a flow chart showing a voice communication method according to another embodiment of the present invention. In this embodiment, the voice communication method comprises following steps:

Step S21: The called terminal receives a calling request from the calling terminal.

Step S22: When the called terminal receives the calling request, the called terminal generates a calling notice and determines whether the calling request comprises a business card information of the calling terminal.

In step S22, if the calling request comprises a business card information of the calling terminal, then the step S23 is performed.

Step S23: The called terminal obtains the business card information of the calling terminal from the calling request and stores the business card information.

In step S22, if the calling request does not comprise a business card information of the calling terminal, then the step S24 is performed.

Step S24: The called terminal does not obtain the business card information from the calling request.

In step S23, the calling request is a INVITE packet, which comprises a SDP content. The step S23 comprises: the called terminal obtains the business card information from the SDP content. Specifically, the called terminal obtains multiple information items from multiple attribute columns of an A session description in the SDP content.

After generating the calling notice, the method could further comprises: the called terminal receives, from a user, an instruction of answering the calling request after or before the step S23.

In addition, before step S23, the method could further comprise: the called terminal provides a selection interface to the user to allow the user to determine whether to store the business card information via the selection interface. In this embodiment, if the user chooses to store the business card information, then the called terminal stores the business card information. Otherwise, the called terminal closes the selection interface.

In this embodiment, the calling terminal determines whether to activate a VoLTE communication mode. If yes, then the calling terminal generates a calling request carrying the business card information of the calling terminal. The calling terminal sends a calling request to the called request such that the called request could obtain the business card information of the calling terminal from the calling request. The called terminal receives the calling request from the calling terminal. When the called terminal receives the calling request, the called terminal generates the calling notice and determines whether the calling request comprises the business card information of the calling terminal. If yes, then the called terminal obtains the business card information from the calling request and stores the business card information. Because the calling terminal could embed the business card information into the calling request, the business card information could be sent to the called terminal along with the calling request when a phone call is made. This allows the users to exchange their business card information and to store the business card information before answering the call or after the call. For example, the user is allowed to store the business card information when the phone rings or vibrates once. This makes it convenient for the calling terminal and the called terminal to exchange the business card information. Furthermore, the called terminal could ask the user whether he wants to store the business card information before the business card information is stored. This could prevent the user from being harassed by other business card information actively pushed to the called terminal. Furthermore, this method allows the user to determine whether to store the business card information after the call. This makes it more convenient for the users to exchange business card information and handle it.

Figure 3:
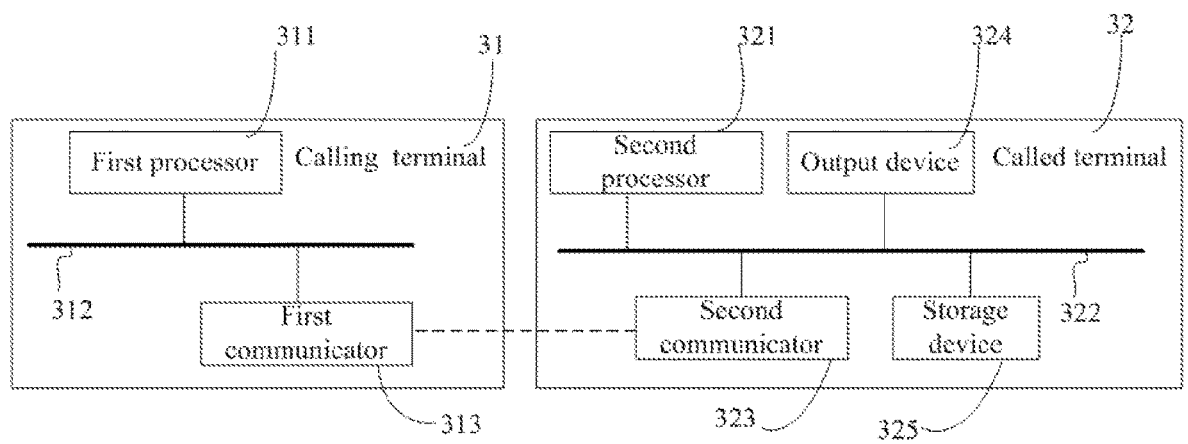
FIG. 3 is a functional block diagram showing a voice communication system based on VoLTE according to an embodiment of the present invention.

Please refer to FIG. 3. FIG. 3 is a functional block diagram showing a voice communication system based on VoLTE according to an embodiment of the present invention. In this embodiment, the system could comprise the calling terminal 31 and the called terminal 32.

The calling terminal 31 could comprise a first processor 311, a first communication bus 312 and a first communicator 313. The first processor 311 is coupled to the first communicator 313 via the first communication bus 312.

The called terminal 32 could comprise a second processor 321, a second communication bus 322, a second communicator 323, an output device 324, and a storage device 325. The second processor 321 is coupled to the second communicator 323, the output device 324, and the storage device 325 via the second communication bus 322.

The first processor 311 is configured to determine whether to activate a VoLTE communication mode. If yes, then the first processor 311 generates a calling request, which comprises a business card information of the calling terminal 31. The first communicator 312 sends the calling request to the second communicator 323. When the second communicator 323 receives the calling request, the second processor 321 controls the output device 324 to generate a calling notice. The second processor 321 further obtains the business card information of the calling terminal 31 and stores the business card information into the storage device 324 when the second processor 321 determines that the calling request does carry the business card information. The storage device 324 is configured to store the business card information.

The calling request is an INVITE packet, which comprises a SDP content. The first processor 311 is configured to assign the business card information to the SDP content such that the calling request comprises the business card information of the calling terminal 31.

In an embodiment, the INVITE packet comprises a header and a SDP content. The SDP content comprises an A session description. The A session description comprises multiple attribute columns. The business card information of the calling terminal 31 could comprise multiple information items corresponding to the user of the calling terminal 31. The information items could be a name, a business name, a business address, a business number, a home number, a cell phone number, a fax number, an email address or other information.

Specifically, the first processor 311 could respectively assign multiple information items of the business card information to multiple attribute columns of the A session description.

The header could comprise a network address information of the called terminal 32, such as a phone number, an IP address or other information, such that the calling request could be sent from the base station to the called terminal 32.

The second processor 321 is configured to obtain business card information from the SDP content. Specifically, the second processor 321 could obtain multiple information items of the business card information from multiple attribute columns of the A session description.

The first processor 311 is configured to control the first communicator 312 to send a calling request corresponding to another communication mode to the second communicator 323 if the first processor 311 determines that the calling terminal 31 does not activate VoLTE communication mode.

Further, the called terminal 32 could further comprise an input device. After the output device 324 generates the calling notice, the called terminal 32 could use the input device to receive, from a user, an instruction of answering the calling request. The step of using the input device to receive the instruction of answering the calling request could be before or after the step of storing the business card information.

The second processor 321 is further configured to utilize the output device 324 to provide the user with a selection interface such that the user could determines whether to store the business card information via the input device. If the user selects to store the business card information, the called terminal 32 follows the user's selection and stores the business card information into the storage device 325. Otherwise, the called terminal 32 does not store the business card information.

The input device could comprise at least one of a touch panel, a keyboard, a touch pad, and a microphone. Surely, the input device could be any other input device. The output device 24 could comprise at least one of a display, a touch panel, and a speaker. In this embodiment, the input device and the output device are realized by a touch panel.

Figure 4:
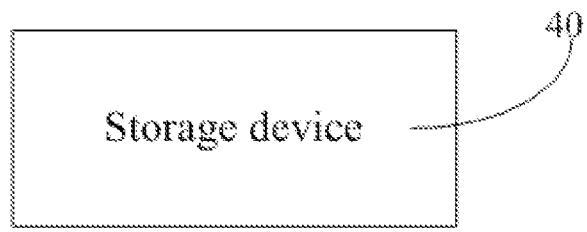
FIG. 4 is a diagram showing a storage device according to an embodiment of the present invention.

Please refer to FIG. 4, which is a diagram showing a storage device according to an embodiment of the present invention. The storage device 40 stores a software program, which could be executed to perform at least one voice communication method based on VoLTE described in the above-mentioned embodiments. In addition, the storage device 40 could be an USB disk, an optical disk, or a server.

In addition, the aforementioned calling terminal, called terminal, or mobile terminal could be a smart phone, a personal digital assistant (PDA) or other devices. Further, they could also be a smart wearable equipment embedded in clothes, accessories, or jewelries or directly wore by a user.

The present invention utilizes a calling terminal to determine whether to activate a VoLTE communication mode. If yes, then the calling terminal generates a calling request carrying a business card information. Further, the calling terminal sends the calling request to the called terminal to allow the called terminal to obtain the business card information of the calling terminal from the calling request. Because the calling terminal could embed the business card information into the calling request, when the calling terminal makes a call, the business card information is sent to the called terminal along with the calling request such that the phone users could easily exchange the business card information.

Above are embodiments of the present invention, which does not limit the scope of the present invention. Any modifications, equivalent replacements or improvements within the spirit and principles of the embodiment described above should be covered by the protected scope of the invention.

What is claimed is:

1. A voice communication method based on voice over long term evolution (VoLTE), comprising:
   utilizing a called terminal to receive a calling request from a calling terminal;
   utilizing the called terminal to generate a calling notice when the called terminal receives the calling request and utilizing the called terminal to determine whether the calling request comprises a business card information of the calling terminal; and
   upon a condition that the calling request comprises the business card information of the calling terminal, then utilizing the called terminal to obtain and store the business card information of the calling request;
   wherein the calling request is an INVITE packet carrying a Session Description Protocol (SDP) content and the step of utilizing the called terminal to obtain and store the business card information of the calling request comprises:
   utilizing the called terminal to obtain multiple information items of the business card information from multiple attribute columns of an A session description in the SDP content.

2. The voice communication method of claim 1, wherein the information items comprise a name, a business name, a business address, a business number, a home number, a cell phone number, a fax number or an email address.

3. The voice communication method of claim 1, wherein the INVITE packet further comprises a header, comprising a network address information of the called terminal.

4. The voice communication method of claim 1, comprising:
   providing a selection interface to a user to receive, via the selection interface, an instruction of the user about whether to store the business card information;

storing the business card information in the condition that the user determines to store the business card information via the selection interface.

5. The voice communication method of claim 1, further comprising:
utilizing the called terminal to receive an instruction of answering the calling request from a user after utilizing the called terminal to generate the calling notice.

6. The voice communication method of claim 5, wherein the step of utilizing the called terminal to receive the instruction of answering the calling request is prior to the step of utilizing the called terminal to obtain and store the business card information of the calling request.

7. The voice communication method of claim 5, wherein the step of utilizing the called terminal to receive the instruction of answering the calling request is after the step of utilizing the called terminal to obtain and store the business card information of the calling request.

8. A voice communication system based on voice over long term evolution (VoLTE), comprising:
a calling terminal, comprising:
a first processor; and
a first communicator, coupled to the first processor; and
a called terminal, comprising:
a second processor;
a second communicator, coupled to the second processor;
an output device; and
a storage device;
wherein the first processor is configured to determine whether to activate a VoLTE calling mode; upon a condition that the VoLTE calling mode is activated, then generate a calling request carrying a business card information of the calling terminal; the first communicator is configured to send the calling request to the called terminal; the second processor is configured to control the output device to generate a calling notice when the second communicator receives the calling request and to further determine whether the calling request comprises the business card information of the calling terminal and obtain and store the business card information of the calling request if the calling request comprises the business card information;
wherein the calling request is an INVITE packet comprising a Session Description Protocol (SDP) content and the first processor is further configured to respectively assign multiple information items of the business card information to multiple attribute columns of an A session description.

9. The voice communication system of claim 8, wherein the first processor is further configured to control the first communicator to send a calling request corresponding to another communication mode to the called terminal if the VoLTE communication mode is not activated.

10. The voice communication system of claim 8, wherein the second processor is further configured to obtain the business card information from the SDP content.

11. The voice communication system of claim 10, wherein the second processor is further configured to obtain multiple information items of the business card information from multiple attribute columns of an A session description in the SDP content.

12. The voice communication system of claim 10, wherein the INVITE packet further comprises a header, comprising a network address information of the called terminal.

* * * * *